(12) United States Patent
Ferdous et al.

(10) Patent No.: US 8,434,084 B2
(45) Date of Patent: *Apr. 30, 2013

(54) RESOURCE ALLOCATOR WITH KNOWLEDGE-BASED OPTIMIZATION

(75) Inventors: Rashed Ferdous, Rochester, MN (US); Arthur J. Meyer, III, Oronoco, MN (US); Carlos P. Sosa, Eagan, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/434,274

(22) Filed: Mar. 29, 2012

(65) Prior Publication Data
US 2012/0192188 A1    Jul. 26, 2012

Related U.S. Application Data

(63) Continuation of application No. 12/848,126, filed on Jul. 31, 2010.

(51) Int. Cl.
G06F 15/16    (2006.01)
G06F 9/46    (2006.01)

(52) U.S. Cl.
USPC .......................................... 718/101; 709/203

(58) Field of Classification Search .................... 718/101
See application file for complete search history.

(56) References Cited

U.S. PATENT DOCUMENTS

| | | | |
|---|---|---|---|
| 7,444,638 B1 | 10/2008 | Xu | |
| 7,454,754 B2 | 11/2008 | Tajima | |
| 7,533,384 B2 | 5/2009 | Chan et al. | |
| 7,958,511 B1* | 6/2011 | Pomerantsev et al. | 718/104 |
| 2007/0143765 A1 | 6/2007 | Aridor et al. | |
| 2008/0244588 A1 | 10/2008 | Leiserson et al. | |
| 2009/0077235 A1 | 3/2009 | Podila | |
| 2009/0228888 A1 | 9/2009 | Vengerov et al. | |

OTHER PUBLICATIONS

C. B. McVey et al., "Development of Iterative Real-time Scheduler to Planner Feedback", University of Michigan, International Joint Conference on Artificial Intelligence, 1997, pp. 1267-1272.
E. Elmroth et al., "A Grid Resource Broker Supporting Advance Reservations and Benchmark-Based Resource Selection", Lecture Notes in Computer Science, 2005, vol. 3732, 10 pages.
M. Kiran et al., "Execution Time Prediction of Imperative Paradigm Tasks for Grid Scheduling Optimization", IJCSNS International Journal of Computer Science and Network Security, Feb. 2009, vol. 9, No. 2, pp. 155-163.

* cited by examiner

*Primary Examiner* — Jennifer To
*Assistant Examiner* — Blake Kumabe
(74) *Attorney, Agent, or Firm* — Walter W. Duft

(57) ABSTRACT

An automated resource allocation technique for scheduling a batch computer job in a multi-computer system environment. According to example embodiments, resource allocation processing may be performed when receiving a batch computer job that needs to be run by a software application executable on more than one computing system in the multi-computer system environment. The job may be submitted for pre-processing analysis by the software application. A pre-processing analysis result comprising job evaluation information may be received from the software application and the result may be evaluated to select a computing system in the multi-computer system environment that is capable of executing the application to run the job. The job may be submitted to the selected computing system to have the software application run the job to completion.

9 Claims, 5 Drawing Sheets

US 8,434,084 B2

RESOURCE ALLOCATOR WITH KNOWLEDGE-BASED OPTIMIZATION

This application is a continuation under 35 U.S.C. 120 of application Ser. No. 12/848,126, filed Jul. 31, 2010, entitled "Resource Allocator With Knowledge-Based Optimization."

BACKGROUND

1. Field

The present disclosure relates to the scheduling of batch computer jobs for execution in a multi-computer system environment. More particularly, the disclosure concerns optimized job scheduling in which computing resources are selected and allocated to minimize job execution time and maximize system operational efficiency.

2. Description of the Prior Art

By way of background, schedulers play an important role in the execution of batch computer jobs in multi-computer system environments. Such environments typically contain a heterogeneous mix of computing systems with differing capabilities and performance characteristics. Software application programs designed to run batch jobs can often be run on any one of a number of different machines, each of which may have a different amount of computing power. Selecting the right computer system to run a particular job is the primary role of the scheduler, and the decisions it makes have consequences in terms of job execution throughput and overall system performance. For example, submitting a job to an available but under-powered system may lead to poor job execution or premature termination. On the other hand, submitting all jobs to the most powerful system available could result in over-utilization of that system and under-utilization of other available systems. It is to improvements in the foregoing field that the present disclosure is directed.

SUMMARY

An automated resource allocation technique is disclosed for scheduling batch computer jobs in a multi-computer system environment. The technique may be embodied in one or more of a system, a method and a computer program product. According to example embodiments of the disclosed technique, resource allocation processing may be performed when receiving a batch computer job that needs to be run by a software application executable on more than one computing system in the multi-computer system environment. The job may be submitted for pre-processing analysis by the software application. A pre-processing analysis result comprising job evaluation information may be received from the software application and the result may be evaluated to select a computing system in the multi-computer system environment that is capable of executing the application to run the job. The job may be submitted to the selected computing system to have the software application run the job to completion.

In accordance with further embodiments of the disclosed technique, evaluation of the pre-processing analysis result may include determining a problem size based on the pre-processing analysis. Determining a problem size may include processing the job evaluation information. Selecting a computing system may include using the problem size to obtain one or more resource utilization estimates for the job from a set of application-specific benchmarking data. The benchmarking data may be arranged to correlate the problem sizes of actual or simulated test runs of the software application on one or more of the computing systems with actual resource utilization requirements associated with test running the previous jobs. Selecting a computing system may further include using the one or more resource utilization estimates to identify a suitable computing system having the resources to run the job. Embodiments of the disclosed technique may further include determining an actual resource utilization required by the selected computer system to run the job to completion. This information may be used to take a responsive action if the actual resource utilization differs from the resource utilization estimate.

BRIEF DESCRIPTION OF THE DRAWINGS

The foregoing and other features and advantages will be apparent from the following more particular description of example embodiments, as illustrated in the accompanying Drawings, in which.

DETAILED DESCRIPTION OF EXAMPLE EMBODIMENTS

Figure 1:
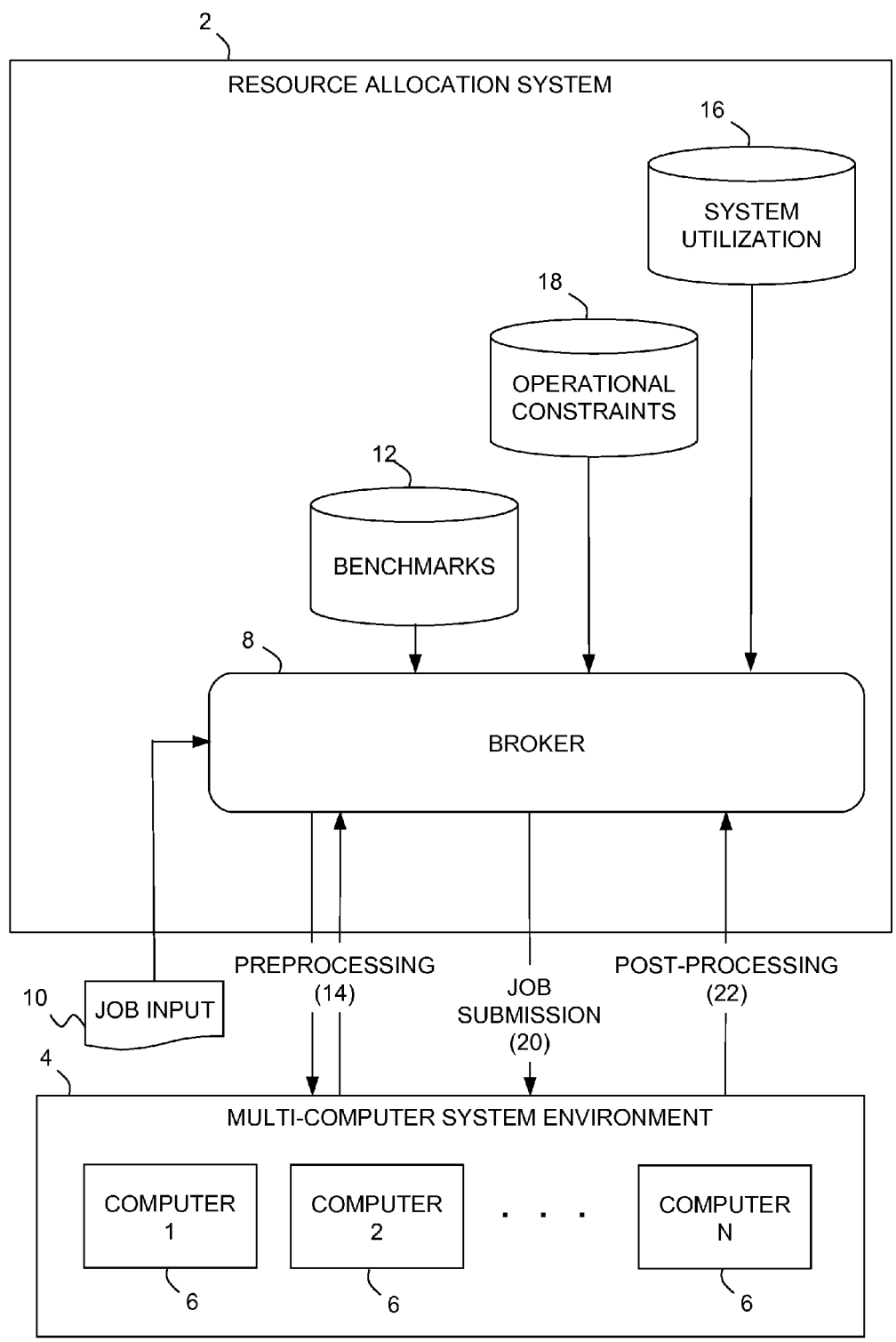
FIG. 1 is a functional block diagram showing an example resource allocation system that may be constructed in accordance with the present disclosure.

Turning now to FIG. 1, a resource allocation system 2 according to an example embodiment is shown. The resource allocation system 2 functions as a scheduler, or as an adjunct to a scheduler, for scheduling batch computer jobs in a multi-computer system environment 4. The multi-computer system environment 4 comprises some number of computing systems 6 (e.g., computer 1 . . . computer n) that are variously programmed to execute software application programs for running the batch computer jobs. As used herein, the term batch computer job refers to an information input that is intended to be submitted to a computer software application program (or a series of programs) for processing in order to produce an information output. By way of example only, the information input could be a data set and the information output could be a calculation based on the data set. Typically, but not necessarily always, a batch computer job will will take the form of an input file, or a set of input files, that contain(s) the information input to be processed by the application.

The computing systems 6 of the multi-computer system environment 4 may comprise a heterogeneous collection of data processing systems and devices having differing computational capabilities and data processing characteristics. Thus, the computing systems 6 may have different numbers of processors, memory resources, input/output resources, etc. By way of example only, one or more of the computing systems 6 could be mainframe computers (such as an IBM System z® machine), others might be midrange systems (such as an IBM System p® or System i® machine), while still others may be smaller systems (such as an IBM system x® machine), including desktops or even laptops and other portable devices. Within the multi-computer system environment 4, the computing systems 6 may be interconnected or non-interconnected, or they may represent a combination of interconnected and non-interconnected machines. In an interconnected arrangement, some or all of the computing systems 6 may operate cooperatively as a loosely coupled computing cluster or grid. Alternatively, some of the computing systems 6 could be integrated into a tightly coupled cluster to form a large-scale computing resource, or even a supercomputer, such as the IBM Roadrunner supercomputer at Los Alamos National Laboratory. The foregoing examples represent only a few of the many implementations that could be present in the multi-computer system 4.

The computing systems 6 within the multi-computer system environment 4 may be programmed to run a given software application program with at least some redundancy. This means that for a software application of interest, there may be at least two computing systems 6 that are programmed to run the application. Thus, when the resource allocation system 2 receives a batch computer job for execution by the application, there may be a choice of at least two computing systems 6 that are potentially available to run the job. It is the function of the resource allocation system 2 in this situation to determine which computer system is best equipped to execute the application and process (run) the job. Generally speaking, it may be beneficial to execute the application on the most powerful machine possible while still meeting applicable processing constraints. This "right-sizing"—matching the application's execution needs to system capabilities—can be done to reserve the more powerful systems to handle executions that the lower powered machines would not be able to handle. Maximum utilization of available resources may thus be achieved.

As stated, the multi-computer system environment 4 may contain powerful systems, such as a mainframe or even a super computer, as well as other less powerful systems. For certain jobs, the amount of computational capability needed (such as CPU power and memory) to complete execution will be dependent on the contents of the job input file(s). Certain combinations of input file contents demand more computation capability than others, and might necessitate running the job on systems with specific requirements to meet certain run-time operational constraints (such as having the job complete within a certain period of time).

The resource allocation system 2 is designed to make the best allocation decision based on resources available. As will be described in more detail below, the resource allocation system 2 does this using a combination of application pre-processing and application execution benchmarking, together with evaluation of system utilization information, to make informed resource allocation decisions. A broker component 8 of the resource allocation system 2 performs the various resource allocation processing operations. By way of introduction, these operations may include extracting information from the input file(s) of a job 10 and using execution data from application-specific benchmarks 12 to predict the job's resource needs. The benchmarks may be based on previous test run jobs (actual test runs) based on various job data sets, or the benchmarks could be determined using theoretical calculations (simulated test runs). Application pre-processing 14 may be performed to potentially improve the accuracy of the benchmarking analysis by providing feedback from the application regarding the manner in which the application intends to process the job input file(s). The benchmark results may be combined with other inputs, such as system utilization information 16 and run-time operational constraints 18, to determine the best available computing system 6 to which the job may be submitted for execution 20 by the target software application. After the job is run, post processing information 22 may be obtained from the software application and an optional post processing analysis may be performed to assess the accuracy of the benchmarks 12 and update or supplement this data if necessary.

Figure 2:
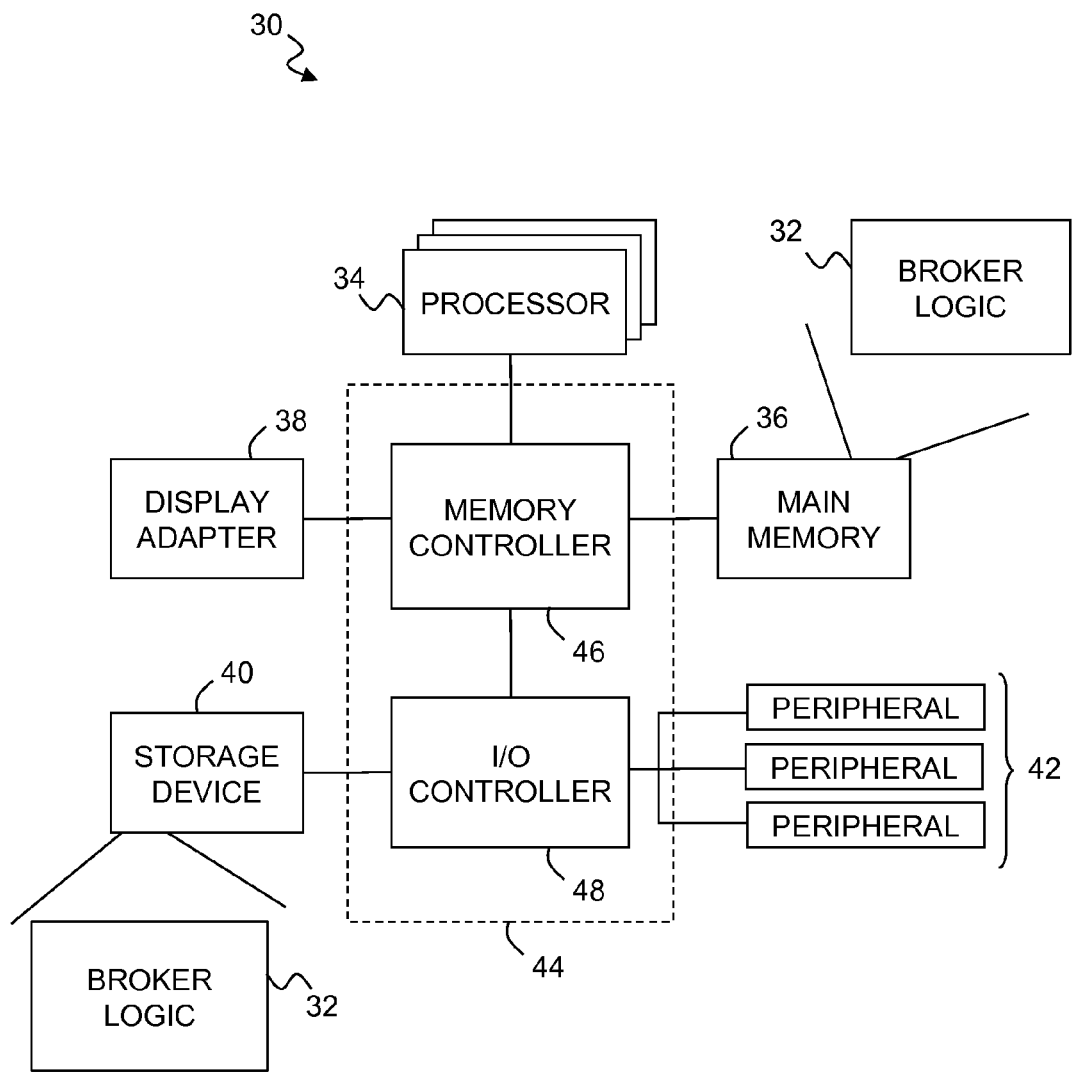
FIG. 2 is functional block diagram showing an example system embodiment of a broker component of the resource allocation system of FIG. 1.

Turning now to FIG. 2, an example computing system 30 is shown that may be used to implement the broker 8. The system 30 supports the execution of machine logic 32 that in turn controls the system 30 to perform the various broker operations. According to one possible embodiment, the system 30 may include one or more processors 34 that operate in conjunction with a main memory 36. As used herein, the term "processors" includes, but is not necessarily limited to, single-threaded or multi-threaded CPUs (Central Processing Units) within single-core or multi-core processor devices (each core being considered a CPU) that are designed to execute program instruction logic, such as software or firmware. The processors 34 may comprise general purpose processors or they may be custom-designed to support the required broker functions. The memory 36 may comprise RAM (Random Access Memory), ROM (Read-Only Memory), combinations of RAM and ROM, or any other type of tangible storage medium capable of storing data in computer readable form. The processors 34 and the memory 36 may be situated within a single computing node (e.g., as part of a single-node SMP system) or they may be distributed over plural nodes (e.g., as part of a NUMA system or cluster). Other distributed topologies could also be employed. Conventional cache memories (not shown) may be respectively associated with the processors 34.

Additional components of the system 30 may include a display adapter 38 for generating visual output information (e.g., text and/or graphics) to a display device (not shown), a persistent storage device 40 (e.g., a disk drive), and various peripheral devices 42 that may include a keyboard input device, a pointer input device, a network interface card (NIC), a USB bus controller, a SCSI disk controller, etc. A bus infrastructure 44, which may include a memory controller hub or chip 46 (e.g., a northbridge) and an I/O (input/output) controller hub or chip 48 (e.g., a southbridge), may be used to interconnect the foregoing elements. It should be understood that the foregoing description is for purposes of illustration only, and that other components and arrangements may also be used to implement the internals of the system 30.

The broker logic 32 may be variously implemented in software, firmware, hardware or any combination thereof. If implemented in software, the broker logic 32 may be loaded from the persistent storage 40 into a portion of the main memory 36 that comprises RAM. If implemented in firmware, the logic 32 could reside in a portion of the main memory 36 that comprises ROM, such as EPROM memory. In software and firmware embodiments of the broker logic 32, the logic may comprise a collection of program instructions, possibly having entry and exit points, written in a suitable programming language. Such programming languages include, but are not limited to, a high level procedural language such as C, a high level object oriented language such as C++, or a lower level language such as assembly. The program instructions written in such languages may be compiled or assembled (as the case may be) into machine language instructions that are capable of execution on the processors 34. When the machine language program instructions are loaded into and executed by the processors 34, the resultant programmed system 30 becomes a particular machine for practicing embodiments of the broker operations to be described herein.

The program instructions in a software or firmware embodiment of the broker logic 32 may be embodied in one or more modules, each of which may be compiled and linked into an executable program, installed in a dynamically linked library, or otherwise made ready for invocation and execution by the system 30. The module(s) may be implemented to run with or without the support of an underlying operating system. The module(s) may also be written in an interpreted programming language such as BASIC, Perl, Python or Java® and executed directly by an interpreter or compiled into byte code for execution by a virtual machine. It will be appreciated that the modules may be callable from other modules or from themselves, and/or may be invoked in response to detected events or interrupts, particularly an incoming batch job 10 (see FIG. 1). Moreover, although in some embodiments a module may be separately compiled, in other embodiments a module may represent a subset of instructions of a separately compiled program, and may not have an interface available to other logical program units.

As mentioned, some embodiments of the logic 32 could be implemented using dedicated logic hardware. Examples of such hardware would include connected logic units such as gates and flip-flops, and/or integrated devices, such as application specific integrated circuits (ASICs) and programmable gate arrays (e.g., field programmable gate arrays or FPGAs) or processors. In some embodiments, such hardware units might be used in lieu of the processors 34, memory 36 and other components of the system 30, i.e., in a particular machine comprising dedicated logic circuits.

Figure 3A:
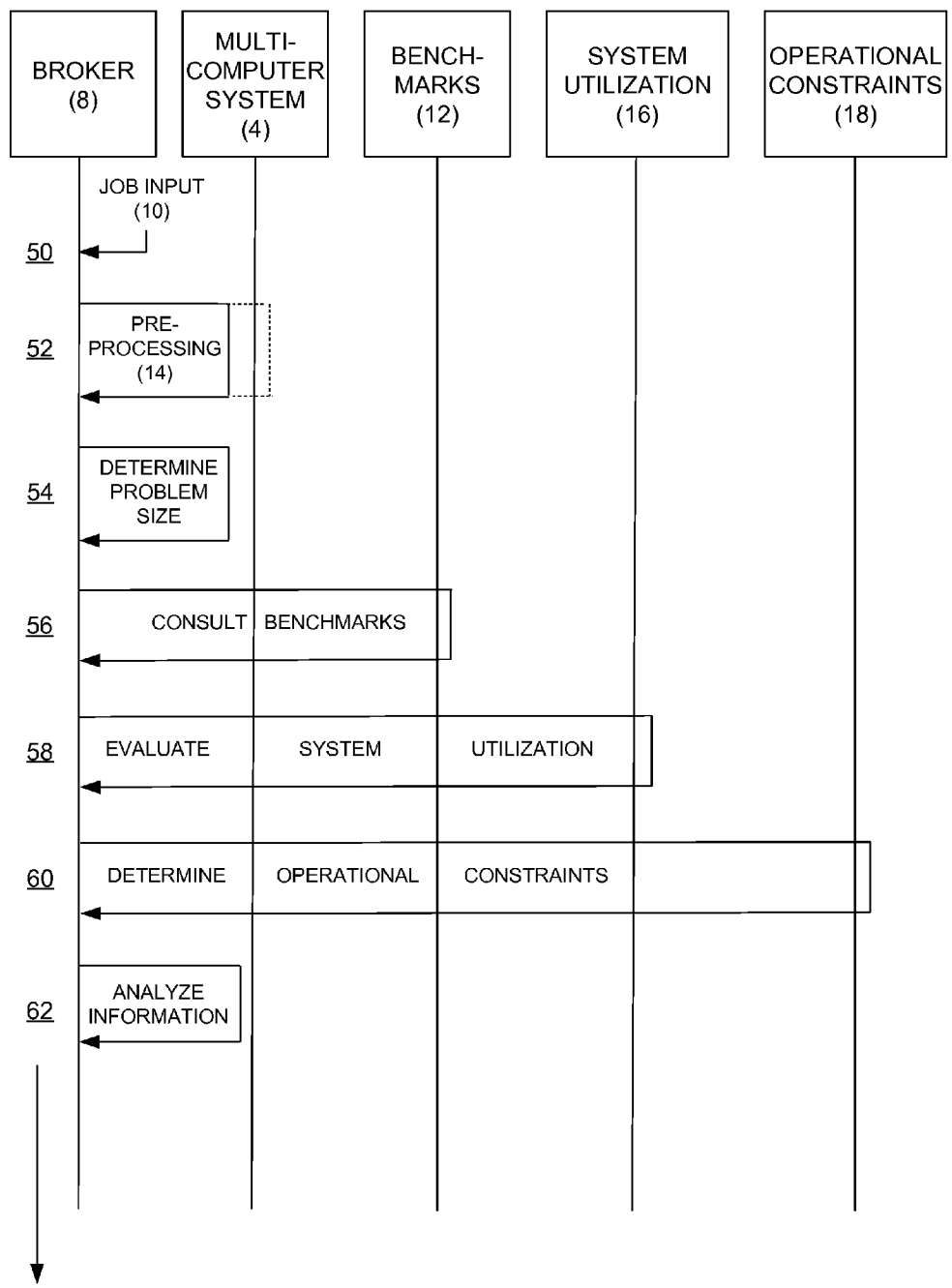
FIGS. 3A and 3B are a two-part flow diagram showing example operations that may be performed in the resource allocation system of FIG. 1.
Figure 3B:
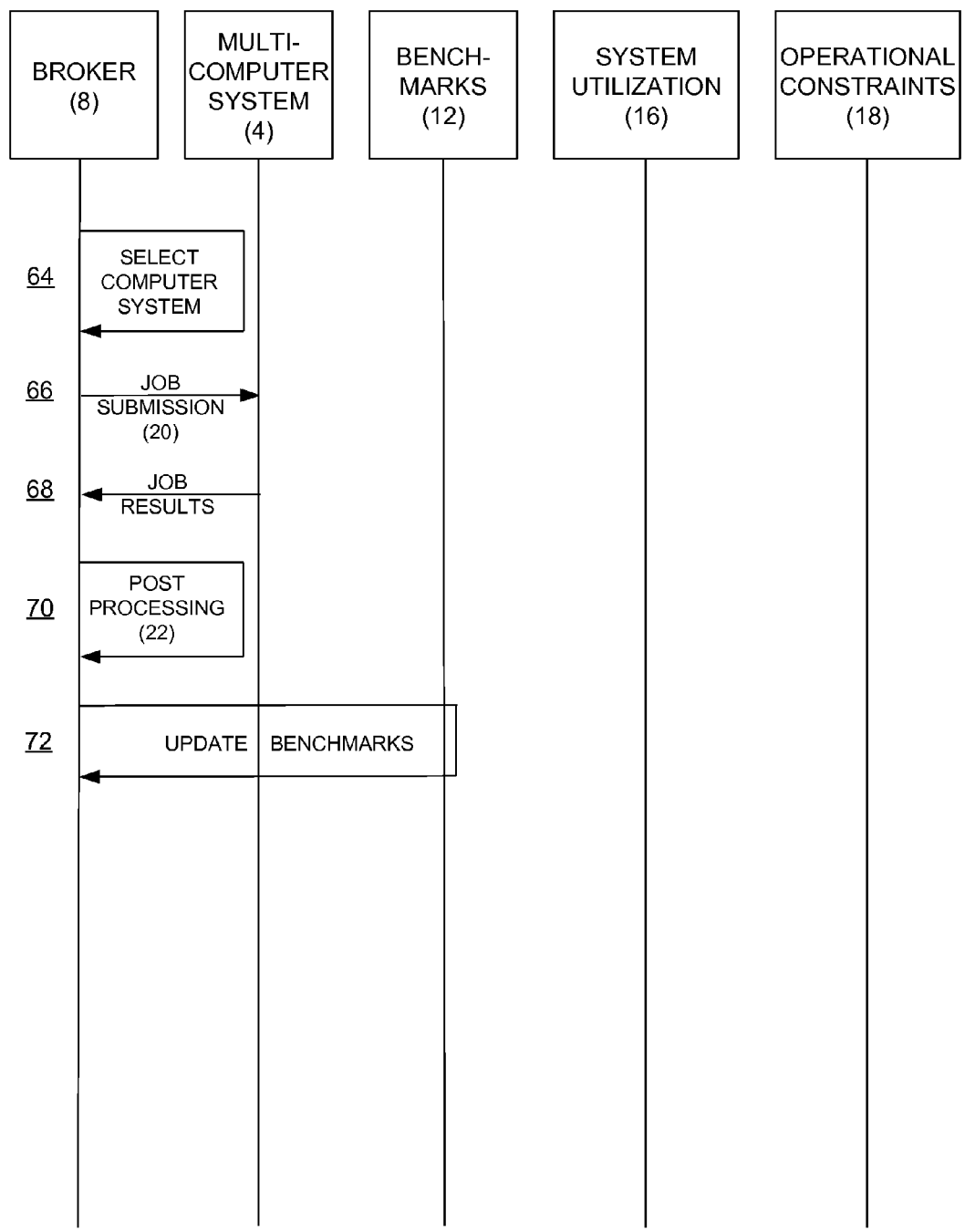

Turning now to FIGS. 3A-3B, a flow chart is shown to illustrate example resource allocation operations that may be performed by the broker 8. In a first example operation 50, the broker 8 receives the job input 10 for processing. The source of the job input 10 will depend on the manner in which the broker 8 is implemented. By way of example, FIG. 1 illustrates an embodiment wherein the broker 4 comprises a front-end job scheduler for the multi-computer system 4. In that case, the job input 10 may be directly received by the broker 8 from a client entity that originates the job. For example, a client computer (not shown) connected to the broker 8 via a network (not shown) or other communication pathway could submit one or more job files containing data to be processed by a specified (target) software application that is hosted somewhere in the multi-computer system environment 4. In an alternative embodiment, the broker 8 might be implemented as an adjunct to a main scheduler (not shown) that interfaces with one or more client computers. In that case, the job input 10 may be received from the client via the main scheduler, which forwards the job to the broker 8 for processing.

In a second example operation 52, the broker 8 initiates pre-processing 14 of the job by having the target software application run the job in a pre-processing mode. As indicated by the dashed lines associated with operation 52, the target software application could be run in pre-processing mode by the broker 8 itself or by one of the computing systems 6 in the multi-computer system environment 4. Still another possibility would be to use some other computing system that is not part of the multi-computer system environment 4. In the pre-processing mode, the application performs an initial evaluation of the job (e.g., by evaluating its one or more job files) in order to generate job evaluation information that informs the broker 8 as to how the application will process the job.

As described below in connection with operation 54, one of the tasks of the broker 8 is to determine a problem size for the incoming job. Knowing the problem size allows the broker 8 to compare the job to historical application-specific information (the benchmarks 12) and make decisions about the computational resources that will be required for the target software application to run the current job. In general, the problem size may be determined using any information that is indicative of the processing resources that will be required to run a job. Problem size determination is a quantitative exercise that is influenced by the manner in which the target application intends to process the job input data. Instead of making assumptions about how the target application will do this, the pre-processing analysis allows the broker 8 to request the application to advise as to how it views the job input. The application will be programmed to respond to the pre-processing request by providing the aforementioned job evaluation information, which the broker may then process and use to compute the problem size. Alternatively, the job evaluation information could itself constitute (or include) a problem size computation result that the broker 8 could process and use without any further problem size determination.

The manner in which the software application performs pre-processing analysis, and the type of job evaluation information it generates, will depend on the nature of the application and the manner in which it processes the job input data. Any information that affects the application's job processing requirements may be relevant. The possibilities in this regard are many and varied. By way of example, the popular Gaussian 09 software application for chemical analysis is a connected series of programs that can be used to carry out a variety of semi-empirical, ab initio, and density functional theory calculations of molecules. For this application, the input may comprise a molecule to be evaluated. The processing resource requirements for the Gaussian 09 application to analyze a particular molecule are a function of the complexity of the molecule. Molecular complexity will thus be a factor to be considered by the broker 8 in determining the problem size for a Gaussian 09 job. However, it is molecular complexity as viewed by the application that is important, and this depends on how the target software application understands and interprets the input molecule.

Consider a case where a client submits the molecule known as thiophene for analysis by the Gaussian 09 software application. Thiophene is a heterocyclic molecule having the formula $C_4H_4S$. One method that may be used by the broker 8 to determine problem size would be to calculate a problem size value as a function of the number occupied orbitals and the number of virtual orbitals in the molecule. For example, the problem size could be given by:

$$P=O^3*V^4,$$

where P represents the problem size value to be determined, $O^3$ is the number of occupied orbitals to the $3^{rd}$ power, and $V^4$ is the number of virtual orbitals to the $4^{th}$ power. The problem size value P will depend on how the Gaussian 09 application counts the respective number of occupied and virtual orbitals in the thiophene molecule. For example, the application may determine that thiophene has O=22 occupied orbitals and V=85 virtual orbitals. Using these orbital counts, the problem size value would be determined to be $P=22^3*85^4=5.55E+11$. On the other hand, had the broker 8 not requested pre-processing analysis, and had it interpreted thiophene as having O=24 occupied orbitals and V=83 virtual orbitals, the problem size value would have been determined to be $P=24^3*83^4=6.56E+11$. This represents an 18% over-estimation of the problem size.

Pre-processing analysis will also be useful if the target software application uses different methods to determine problem size for different job inputs. For example, consider a case where the Gaussian 09 application used two or more different equations to calculate a problem size value, depending on the input molecule. Thus, for some molecules the application might use the above-discussed equation $P=O^3*V^4$, whereas it might use another equation for other molecules, such as $P=O^2*T^3$, where P again represents the problem size value, $O^2$ is the number of occupied orbitals to the $2^{nd}$ power, and $T^3$ is the total number of orbitals to the $3^{rd}$ power. Significantly different problem size values may result depending on which of these equations is used to determine problem size.

By way of further example, it will noted that the problem size equations described above are strictly based on molecular orbitals without taking into account molecular geometry. Thiophene is a highly symmetric heterocyclic molecule. Consider a case where the benchmarks 12 are all based on execution of the Gaussian 09 application for several molecules of the paraffinic hydrocarbon species known as alkanes. These hydrocarbons are saturated aliphatic chains of the form $C_nH_{2n}$. Methane ($CH_4$), ethane ($C_2H_6$), propane ($C_3H_8$), butane ($C_4H_{10}$) and pentane ($C_5H_{12}$) represent several light end examples of such hydrocarbons. Larger size alkanes are found in gasoline, kerosene and diesel fuel fractions. If the broker 8 used the benchmarks for these molecules to determine the resource requirements for thiophene, it might find a closely matching problem size and use the benchmark information associated with that value to estimate the required resources. However, because thiophene has a highly symmetrical cyclic geometry and alkanes do not, the actual resource utilization for thiophene could be significantly less than the resource estimate. Thus, it would be advisable in this example for the broker 8 to take into account molecular structure when determining problem size. Advantageously, the pre-processing analysis 52 allows the broker 8 to obtain such job evaluation information from the target application.

In the third example operation 54, the problem size determination is made by the broker 8. As stated above, and as will be described in more detail below in connection with operation 56, the goal of problem size determination is to provide a measure of job complexity that can be used to compare the incoming job with historical application-specific execution information represented by the benchmarks 12. The basic assumption underlying the use of problem size to evaluate benchmarks is that the data processing resources required to execute the current job will be similar to the processing requirements of actual or simulated test runs having the same or similar problem size. The problem size should be determined in a manner that most accurately produces this desired result.

As just discussed, the problem size may be quantified using the job evaluation information determined from the pre-processing analysis. As indicated, the problem size determination will depend on the nature of the job input data and the processing to be performed by the target software application. The problem size calculation illustrated above in connection with the Gaussian 09 application is but one example. Many other techniques could be used as may be appropriate for each situation. As also mentioned, a problem size result might be generated by the target application as part of the pre-processing analysis. In that case, the broker 8 might simply adopt the same value without requiring any further problem size evaluation to complete operation 54.

In the fourth example operation 56, the broker 8 consults the benchmarks 12. As previously stated, the benchmarks 12 associate the problem size of previous real or simulated test runs with the actual resource requirements associated with such jobs. Thus, the purpose of consulting the benchmarks 12 is for the broker 8 to identify one or more actual or simulated test runs whose problem size most closely matches the problem size determined in operation 54. Then the resource requirements for such benchmark(s) may be used as an upper bound on the resource utilization estimate for the target application to run the current job.

The benchmarks 12 can be maintained on or in any suitable database, data store, memory or other medium that is accessible to the broker 8. As stated, each benchmark 12 represents an actual or simulated test run by a target software application on a particular computing system 6 in the multi-computing system environment 4. The problem size of the test run is correlated to one or more values indicating the actual resources required to run the job on the particular system. For example, one actual resource utilization value that could be used is CPU time. Other values, such as for memory usage and input/output resource requirements, could also be specified.

The benchmarks 12 may be grouped in any desired manner and maintained on any desired number of physical storage media. One technique for managing the benchmarks 12 would be to segregate benchmarks by application, such as by using separate benchmark files, directories, partitions, and/or storage devices for each application. Each benchmark for a given application might then be arranged to specify a problem size, one or more associated resource utilization values, and a computing system 6 that produced the resource utilization value(s). If the same job was run on several of the computing systems 6, there will be a corresponding number of entries for that job.

Figure 4:
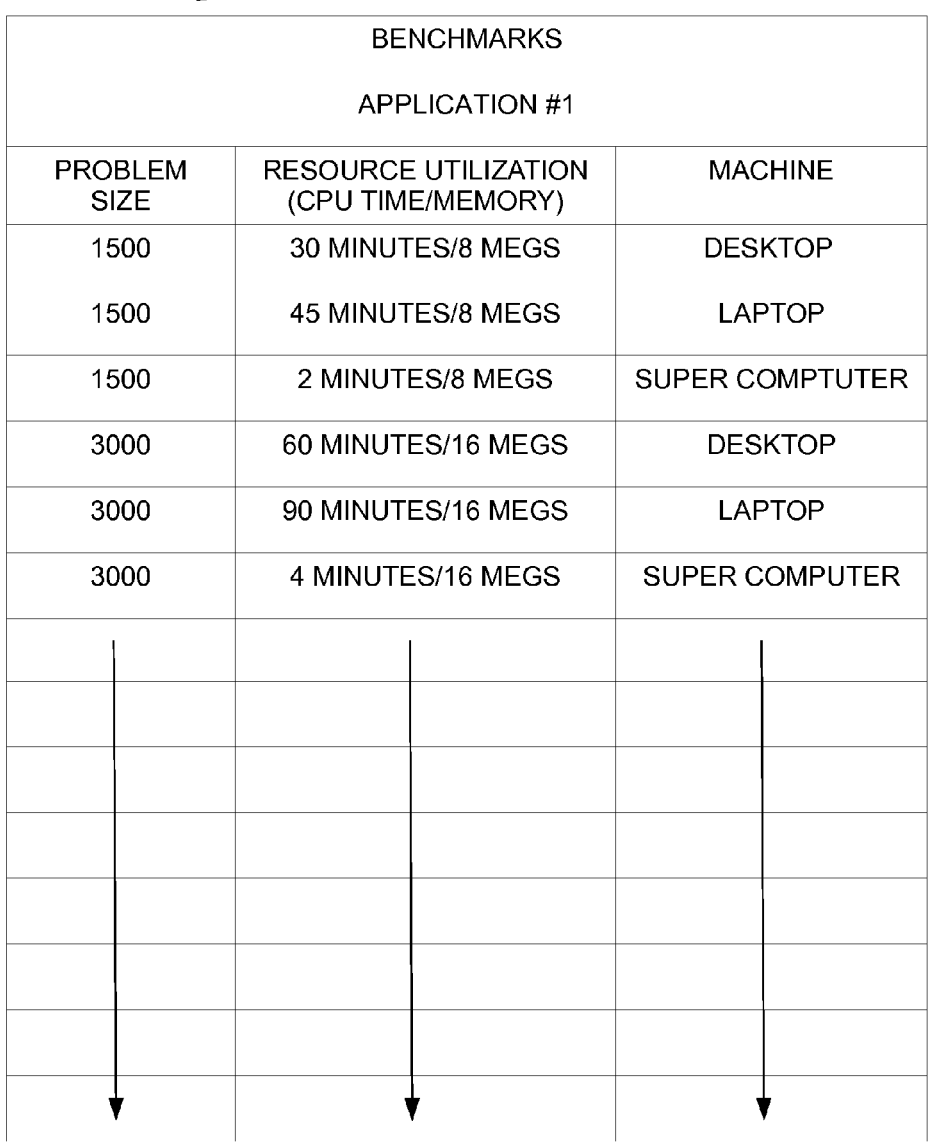
FIG. 4 is a table showing an example set of benchmarks that may be used to make resource allocation decisions.

FIG. 4 illustrates such an arrangement. It depicts a benchmark data structure 12A for an application identified as Application #1. Although there are many suitable data formats that could be used to implement the benchmark data structure 12A, FIG. 4 arranges the benchmarks 12 in a relational database table. This arrangement is for purposes of example only. The left-hand column (key) of the illustrated table contains problem size information. The right-hand column contains machine information, in this case a laptop, a desktop and a super computer. The middle column contains the resource utilization information, in this case a combination of CPU time and memory usage.

As stated above, when the broker 8 consults the benchmarks 12, it will attempt to locate one or more entries whose problem size most closely matches the problem size determined in operation 54 for the current job. Using the example of FIG. 4, if the problem size for the current job was 1400, the broker 8 would tend to select the first three benchmarks associated with a problem size of 1500 to determine the upper bound on the current request to run Application #1. The benchmarks associated with the large problem size of 3000 would not be relevant because they would overestimate the required resources for the current job. As part of its benchmark consultation per operation 56, the broker 8 would retrieve the three corresponding CPU time/memory usage values of 30 minutes/8 megabytes for the desktop, 45 minutes/8 megabytes for the laptop, and 2 minutes/8 megabytes for the supercomputer. The broker 8 will thus have identified three machines that are capable of running the incoming job, together with the amount of resources (in terms of CPU time and memory usage) required to run the job on each machine. As previously noted, FIG. 4 represents only one example of the type of benchmark information that could be maintained for retrieval by the broker 8.

In an alternate embodiment, the broker 8 might attempt to interpolate between two sets of benchmarks when the problem size does not exactly match the benchmark data. For example, assume that the problem size determined for the current job was 2250. This is half way between the benchmark problem size entries of 1500 and 3000 in FIG. 4. If there is a linear relationship between problem size and resource utilization, the broker 8 might use resource estimates that are half way between the estimates associated with the 1500 and 3000 problem size entries. Thus, for a problem size of 2250, the broker 8 could calculate CPU time/memory usage values of 45 minutes/8 megabytes for the desktop, 67.5 minutes/8 megabytes for the laptop, and 3 minutes/8 megabytes for the supercomputer. If the relationship between problem size and resource utilization is non-linear, the interpolation could result in other resource estimates being calculated.

In the fifth example operation 58, the broker 8 consults the system utilization information 16. This information specifies the processing capabilities of the computing systems 6 that are available in the multi-computer system environment 4. Such information may include CPU and memory availability, as well as the software applications that are currently able to run on each system. The information 12 can be static or dynamic, depending on design preferences. If the information is dynamic, it could be updated at any desired time, such as at broker start-up time, when each job is received, or on an as-needed basis. Like the benchmarks 12, the system utilization information 16 can be maintained on or in any suitable database, data store, memory or other medium that is accessible to the broker 8. If desired, an external utility or program may be used to populate the information 16. Alternatively, the broker 8 could do so. When consulting the system utilization information 16 during operation 58, the broker 8 can focus on the machines that were identified in benchmarks 12 as being candidate machines for running the current job. Thus, in the example of FIG. 4, the broker 8 may determine the current utilization level of the desktop, the laptop and the supercomputer.

In the sixth example operation 60, the broker 8 consults the operational constraints 18, if such are available. This optional information specifies constraints that may be imposed by a job-submitting client, a system administrator or other entity regarding execution of the current job. For example, the operational constraints 18 could specify the maximum time that it should take to execute the job. Like the benchmarks 12 and the system utilization information 16, the operational constraints 18 can be maintained on or in any suitable database, data store, memory or other medium that is accessible to the broker 8. This information could be static or dynamic in nature.

In the seventh and eighth example operations 62 and 64, the broker 8 analyzes the information obtained from consulting the benchmarks 12, the system utilization information 16 and the operational constraints 18, then makes a selection of which computing system 6 will run the current job. As previously stated, the broker 8 may be programmed to favor selection of the least powerful computing system 6 that is capable of running the job. Using the example given above in connection with FIG. 4, if the current job has a problem size of 1400, the following candidate machines and their estimated resources would have been determined from the benchmarks 12:

a. Desktop: CPU Time=30 minutes; Memory=8 megabytes
b. Laptop: CPU Time=45 minutes; Memory=8 megabytes
c. Supercomputer: CPU Time=2 minutes; Memory=8 megabytes In this example, the laptop is the least powerful machine that is capable of running the current job. If there are no other restrictions, the broker might select the laptop to run the job. On the other hand, if the operational constraints placed a limit of 30 minutes on the job processing time, the laptop would be eliminated from contention and the broker 8 might then select the desktop to run the job. However, it may be that the system utilization information 16 indicates that the desktop does not have 30 minutes of CPU time and/or 8 megabytes of memory currently available due to high processing loads on that system. In that case, the broker 8 might resort to selecting the supercomputer as the only viable system to run the job. It will be appreciated that the foregoing scenario is but one example of the manner in which the broker 8 might select a computing system 6.

Once a computing system 6 has been selected to run a job, operation 66 is performed and the broker 8 submits the job to the selected system for processing by the target application. This operation may be performed in the usual manner. However, the job submission may additionally include a request that the selected system return job results to the broker. As will be seen below, the job results needed by the broker are those that contain information regarding the resources that were utilized to run the job. The job results may also include the job output data that represents the application's processing of the job input data. This data can be forwarded by the broker to the job-submitting client. Alternatively, the job output data could be forwarded directly by the application to the client.

Operation 68 represents the return of job results to the broker 8. This operation may be followed by an optional post-processing operation 70 that can be performed by the broker 8 to assess the actual resource utilization for the completed job. During post processing, the broker 8 determines if the job's actual resource utilization differs from the estimated resources determined from the benchmarks 12. If they do, operation 72 can be performed to take a responsive action, such as notifying a system administrator who may then investigate the reason for the discrepancy. There could be various reasons why the job's actual resource utilization does not match the estimated resources determined from the benchmarks 12, including but not limited to an operational degradation problem in the computing system 6 that ran the job. In other cases, it may be that the benchmark data needs to be modified. This could result in a decision to update the benchmarks with the actual resource utilization information. Alternatively, if the problem size did not exactly match any of the benchmarks, the completed job could be added as a new benchmark. This might be the case for the above example wherein the problem size was 1400 and the closest benchmarks had a problem size of 1500. In this instance, a new benchmark with the problem size of 1400 could be added. The computing system 6 associated with this benchmark would be the super computer that ran the job and the resource utilization requirements would be the CPU time and the memory resources actually needed to complete the job. In an alternate embodiment, the broker 8 could adopt a self-correcting approach and attempt to directly implement its own responsive action without necessarily notifying the system administrator.

Accordingly, a resource allocation technique has been disclosed. It will be appreciated that the foregoing concepts may be variously embodied in any of a data processing system, a machine implemented method, and a computer program product. An example data processing system and machine implemented method were previously described in connection with FIGS. 1-4. With respect to a computer program product, digitally encoded program instructions may be stored on one or more computer-readable data storage media for use in controlling a computer or other digital machine or device to perform the required functions. The program instructions may be embodied as machine language code that is ready for loading and execution by the machine apparatus, or the program instructions may comprise a higher level language that can be assembled, compiled or interpreted into machine language. Example languages include, but are not limited to C, C++, assembly, to name but a few. When implemented on a machine comprising a CPU, the program instructions combine with the CPU to provide a particular machine that operates analogously to specific logic circuits, which themselves could be used for the invention.

Figure 5:
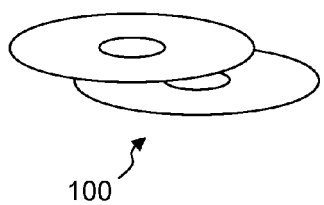
FIG. 5 is a diagrammatic view showing an example computer program product embodiment of a broker component of the resource allocation system of FIG. 1.

Example data storage media for storing such program instructions are shown by reference numeral 100 in FIG. 5. The storage media 100 are illustrated as being portable optical storage disks of the type that are conventionally used for commercial software sales, such as compact disk-read only memory (CD-ROM) disks, compact disk-read/write (CD-R/W) disks, and digital versatile disks (DVDs). Such storage media can store the program instructions of the invention either alone or in conjunction with an operating system or other software product that incorporates the required functionality. The storage media 100 could also be provided by other portable storage media (such as floppy disks, flash memory sticks, etc.), or storage media combined with drive systems (e.g. disk drives), or storage media incorporated in data processing platforms, such as random access memory (RAM), read-only memory (ROM) or other semiconductor or solid state memory. More broadly, the storage media 100 could comprise any electronic, magnetic, optical, infrared, semiconductor system or apparatus or device, or any other tangible entity representing a machine, manufacture or composition of matter that can contain, store, communicate, or transport the program instructions for use by or in connection with an instruction execution system, apparatus or device, such as a computer. For all of the above forms of storage media, when the program instructions are loaded into and executed by an instruction execution system, apparatus or device, the resultant programmed system, apparatus or device becomes a particular machine for practicing embodiments of the method(s) and system(s) described herein.

While various embodiments have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. An automated resource allocation method for scheduling a batch computer job in a multi-computer system environment including a plurality of computer systems, comprising:
    receiving, by a broker, said batch computer job that needs to be run by a target software application, wherein said target software application is executable on more than one computing system in said multi-computer system environment;
    submitting, by said broker, said batch computer job to said target software application for pre-processing analysis;
    receiving, by said broker, a pre-processing analysis result from said target software application, said pre-processing analysis result comprising job evaluation information that informs said broker as to how said target software application will process said batch computer job;
    evaluating, by said broker, said pre-processing analysis result to select one of said computing systems in said multi-computer system environment that is capable of executing said target software application to run said batch computer job, wherein said evaluating comprises determining a problem size of said batch computer job; and
    submitting, by said broker, said batch computer job to said selected computing system to have said target software application run said batch computer job to completion.

2. The method of claim 1, wherein said determining a problem size comprises processing said job evaluation information.

3. The method of claim 2, wherein said selecting one of said computing systems comprises using said problem size to obtain one or more resource utilization estimates for said batch computer job from a set of application-specific benchmarking data that correlates problem sizes of actual or simulated test runs of said target software application on one or more of said computing systems with actual resource utilization requirements associated with said test runs.

4. The method of claim 3, wherein said selecting one of said computing systems further comprises using said one or more resource utilization estimates to identify a suitable one of said computing systems to serve as said selected computing system that runs said batch computer job.

5. The method of claim 4, further including determining an actual resource utilization required by said selected computer system to run said batch computer job to completion and taking a responsive action if said actual resource utilization differs from said resource utilization estimate.

6. A method for performing resource allocation operations for scheduling a batch computer job in a multi-computer system environment including a plurality of computer systems, comprising:
    providing a broker operable to receive said batch computer job that needs to be run by a target software application, wherein said target software application is executable on more than one computing system in said multi-computer system environment;
    providing a benchmark data store containing one or more benchmarks, each benchmark representing an actual or simulated run of a previous batch computer job by said target software application executing on one of said computing systems in said multi-computer system environment;
    providing a system utilization data store containing system utilization information for said plurality of computing systems in said multi-computer system environment;
    providing an operational constraints data store containing operational constraint information for said batch computer job;
    operating said broker to execute resource allocation operations, comprising: submitting said batch computer job to said target software application for pre-processing analysis;
    receiving a pre-processing analysis result from said target software application, said pre-processing analysis result comprising job evaluation information that informs said broker as to how said target software application will process said batch computer job;
    evaluating said pre-processing analysis result to determine a problem size of said batch computer job and select a benchmark in said benchmark data store whose benchmark problem size correlates to said batch computer job problem size, said selected benchmark including a resource utilization estimate in association with said batch computer job problem size;
    consulting said selected benchmark, said system utilization data store, and said operational constraints data store to select one of said computing systems in said multi-computer system environment that is capable of executing said application to run said batch computer job; and submitting said batch computer job to said selected computing system to have said target software application run said batch computer job to completion.

7. The method of claim 6, wherein said pre-processing analysis is performed by said target software application executing on one of said computing systems in said multi-computer environment, or executing on said broker or another computing system.

8. The method of claim 6, wherein said broker either comprises a main job scheduler for said multi-computer system environment or is an adjunct to a main scheduler for said multi-computer system environment.

9. The method of claim 6, wherein said resource allocation operations further include determining an actual resource utilization required by said selected computer system to run said batch computer job to completion and notifying a system administrator if said actual resource utilization differs from said resource utilization estimate.

\* \* \* \* \*